United States Patent
Davis et al.

(10) Patent No.: US 11,486,497 B2
(45) Date of Patent: Nov. 1, 2022

(54) COMPACT BRUSH SEAL

(71) Applicant: UNITED TECHNOLOGIES CORPORATION, Farmington, CT (US)

(72) Inventors: Timothy M. Davis, Kennebunk, ME (US); Mark J. Rogers, Kennebunk, ME (US); Jeffrey M. Wittman, Wells, ME (US); James R. Plante, East Waterboro, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 1113 days.

(21) Appl. No.: 15/653,892

(22) Filed: Jul. 19, 2017

(65) Prior Publication Data
US 2019/0024801 A1   Jan. 24, 2019

(51) Int. Cl.
*F01D 11/00*     (2006.01)
*F16J 15/3288*   (2016.01)
*F16J 15/3212*   (2016.01)

(52) U.S. Cl.
CPC ......... *F16J 15/3288* (2013.01); *F01D 11/005* (2013.01); *F16J 15/3212* (2013.01); *F05D 2240/56* (2013.01)

(58) Field of Classification Search
CPC .... F16J 15/3288; F16J 15/328; F16J 15/3276; F16J 15/3232; F16J 15/3268
USPC ...................................................... 415/173.3
See application file for complete search history.

(56) References Cited

U.S. PATENT DOCUMENTS

| | | | |
|---|---|---|---|
| 4,202,554 A | 5/1980 | Snell | |
| 5,480,162 A * | 1/1996 | Beeman, Jr. | F01D 9/023 277/355 |
| 5,848,874 A * | 12/1998 | Heumann | F01D 9/042 415/189 |
| 6,059,526 A | 5/2000 | Mayr | |
| 6,622,490 B2 | 9/2003 | Ingistov | |
| 6,695,314 B1 * | 2/2004 | Gail | F01D 11/001 277/355 |
| 7,290,769 B2 * | 11/2007 | Plona | F01D 11/003 277/355 |
| 2016/0047258 A1 | 2/2016 | Hall et al. | |
| 2016/0061330 A1 * | 3/2016 | Davis | B23K 31/02 277/355 |
| 2016/0115814 A1 | 4/2016 | Davis et al. | |

FOREIGN PATENT DOCUMENTS

| | | |
|---|---|---|
| EP | 2990699 | 3/2016 |
| WO | 2003091609 | 11/2003 |
| WO | 2014158589 | 10/2014 |

OTHER PUBLICATIONS

European Patent Office, European Search Report dated Dec. 14, 2018 in Application No. 18181543.2.

\* cited by examiner

*Primary Examiner* — David E Sosnowski
*Assistant Examiner* — Wayne A Lambert
(74) *Attorney, Agent, or Firm* — Snell & Wilmer L.L.P.

(57) ABSTRACT

A seal structure may comprise a cavity defined at least partially by an axial surface and a radial surface. A brush seal may be disposed in the cavity. The brush seal may comprise a bristle pack and a backing plate coupled to the bristle pack. A first surface of the backing plate may contact the axial surface, and a second surface of the backing plate may contact the radial surface.

20 Claims, 5 Drawing Sheets

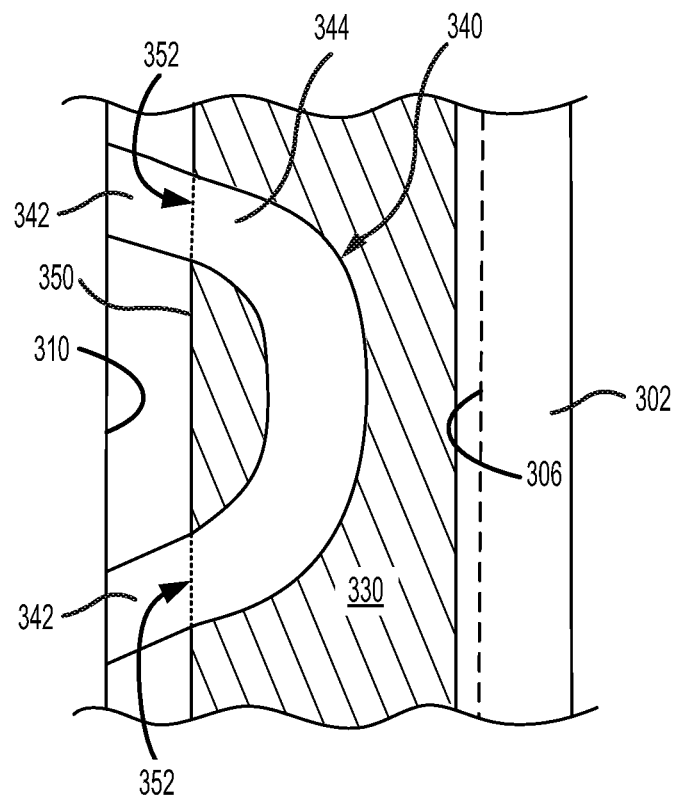
FIG.4B
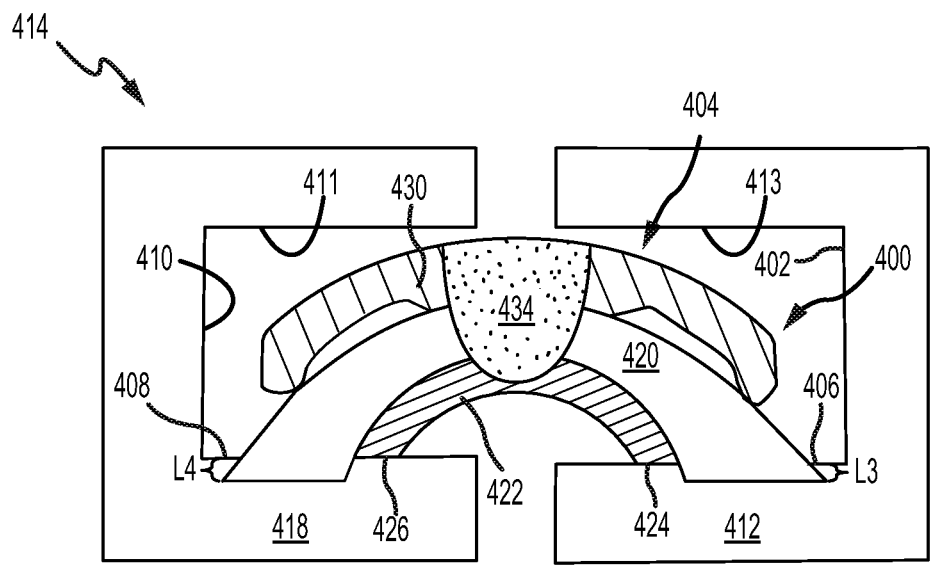
FIG.5
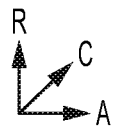

COMPACT BRUSH SEAL

FIELD OF INVENTION

The present disclosure relates to seal structures, and, more specifically, to a seal structure for a gas turbine engine.

BACKGROUND

Gas turbine engines may comprise multiple gas flows at different temperatures and pressures. For example, the engine may have a primary or core air flow and a separate cooling air flow. Gas in the primary or core airflow in a turbine section, for example may be hot compared to the cooling air flowing in internal cavities of the turbine parts. In some locations, seals may be used to prevent or limit the bleed gas from one area of the engine to another.

One location of the engine where sealing may be employed is between a blade outer air seal and a vane in a turbine. The cavity between the blade outer air seal and vane may be relatively compact such that limited space may be available for a sealing structure. Gaps between a backing plate of brush seal and the sealing surface can cause the bristles of the brush seal to blow-over or bend at high pressure differentials, which may lead to bristle yield and leakage at the sealing interface.

SUMMARY

A seal structure may comprise a cavity defined at least partially by an axial surface and a radial surface. A brush seal may be disposed in the cavity. The brush seal may comprise a bristle pack and a backing plate coupled to the bristle pack. A first surface of the backing plate may contact the axial surface, and a second surface of the backing plate may contact the radial surface.

In various embodiments, a retention structure may be coupled to the bristle pack opposite the backing plate. A spring may be in operable communication with retention structure. The spring may force the bristle pack toward the axial surface. The spring may comprise at least one of a wave spring or a leaf spring. The spring may comprise a support structure disposed radially outward of the retention structure. A first distance extending from a first end of the bristle pack to the first surface of the backing plate may be less than or equal to 0.010 inches. A second distance extending from a second end of the bristle pack to the second surface of the backing plate may be less than or equal to 0.010 inches.

In various embodiments, the seal structure may further comprise a weld bonding the bristle pack to the backing plate. A first of a first bristle of the bristle pack extending from the weld to the axial surface of the cavity may be different from a second length of a second bristle of the bristle pack extending from the weld to the radial surface of the cavity. The first surface of the backing plate may be parallel to the axial surface of the cavity and the second surface of the backing plate may be parallel to the radial surface of the cavity. The backing plate may comprise at least one of a cobalt-based alloy or a nickel-based alloy.

A seal structure of a gas turbine engine may comprise a vane, a blade outer air seal (BOAS) adjacent to the vane, and a brush seal disposed in a cavity defined at least partially by a first surface of the BOAS and a second surface of the vane. The brush seal may comprise a bristle pack and a backing plate coupled to the bristle pack. The backing plate may contact the first surface of the BOAS and the second surface of the vane.

In various embodiments, the first surface of the BOAS may comprise a radial surface of the BOAS, and the second surface of the vane may comprise a first axial surface of the vane. A spring may be in operable communication with the brush seal. The spring may be located between the brush seal and a second axial surface of the BOAS. The spring may comprise a support structure disposed radially outward of a biasing portion of the spring.

In various embodiments, the first surface of the BOAS may comprise a first radial surface of the BOAS, and the second surface of the vane may comprise a second radial surface of the vane. The bristle pack may extend a first length beyond a first surface of the backing plate. The bristle pack may extend a second length beyond a second surface of the backing plate The first length may be different from the second length. A first surface of the backing plate may be oriented substantially orthogonal to a second surface of the backing plate.

A seal structure may comprise a vane, a BOAS adjacent to the vane, and a brush seal disposed in a cavity defined at least partially by the BOAS and the vane. The brush seal may comprise a bristle pack, and a backing plate coupled to the bristle pack. The backing plate may contact a first surface of the vane and a second surface of the BOAS.

In various embodiments, the first surface of the vane may comprise a first radial surface of the vane. The second surface of the BOAS may comprise a second radial surface of the BOAS.

In various embodiments, the first surface of the vane may comprise an axial surface of the vane, and the second surface of the BOAS may comprise a radial surface of the BOAS.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 4B illustrates a radially inward looking view of the seal structure of FIG. 4A, in accordance with various embodiments; and FIG. 5 illustrates a seal structure comprising a brush seal having a bristle pack extending between two radial surfaces, in accordance with various embodiments.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
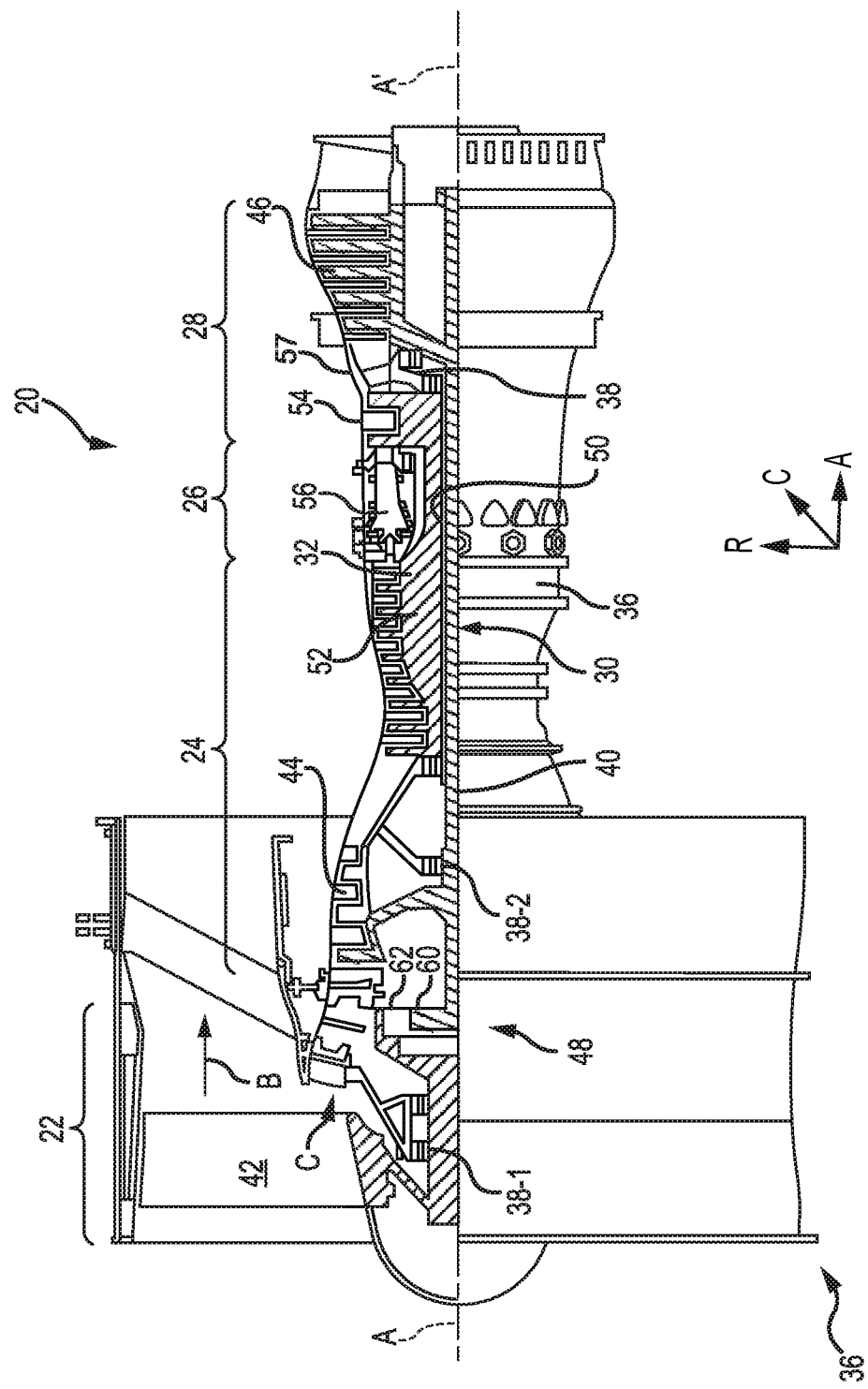
FIG. 1 illustrates an exemplary gas turbine engine, in accordance with various embodiments.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive fluid (e.g., air) along a path of bypass airflow B while compressor section 24 can drive fluid along a core flowpath C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures, as well as industrial gas turbines.

Gas turbine engine 20 may generally comprise a low speed spool 30 and a high speed spool 32 mounted for rotation about an engine central longitudinal axis A-A' relative to an engine static structure 36 (also referred to as an engine casing structure) via several bearing systems 38, 38-1, and 38-2. Engine central longitudinal axis A-A' is oriented in the z direction on the provided xyz axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. As used herein, a "high pressure" compressor or turbine experiences a higher pressure than a corresponding "low pressure" compressor or turbine.

A combustor 56 may be located between high pressure compressor 52 and high pressure turbine 54. A mid-turbine frame 57 of engine casing structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion. The gas turbine engine 20 may be, for example, a high-bypass ratio geared engine. In various embodiments, the bypass ratio of the gas turbine engine 20 may be greater than about six (6). In various embodiments, the bypass ratio of the gas turbine engine 20 may be greater than ten (10). In various embodiments, the geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). In various embodiments, the bypass ratio of the gas turbine engine 20 is greater than about ten (10:1). In various embodiments, the diameter of the fan 42 may be significantly larger than that of the low pressure compressor 44, and the low pressure turbine 46 may have a pressure ratio that is greater than about five (5:1). The low pressure turbine 46 pressure ratio may be measured prior to the inlet of the low pressure turbine 46 as related to the pressure at the outlet of the low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared engine, such as a geared turbofan, or non-geared engine, such as a turbofan, a turboshaft, or may comprise any gas turbine engine as desired.

In various embodiments, the low pressure compressor 44, the high pressure compressor 52, the low pressure turbine 46, and the high pressure turbine 54 may comprise one or more stages or sets of rotating blades and one or more stages or sets of stationary vanes axially interspersed with the associated blade stages but non-rotating about engine central longitudinal axis A-A'.

Figure 2:
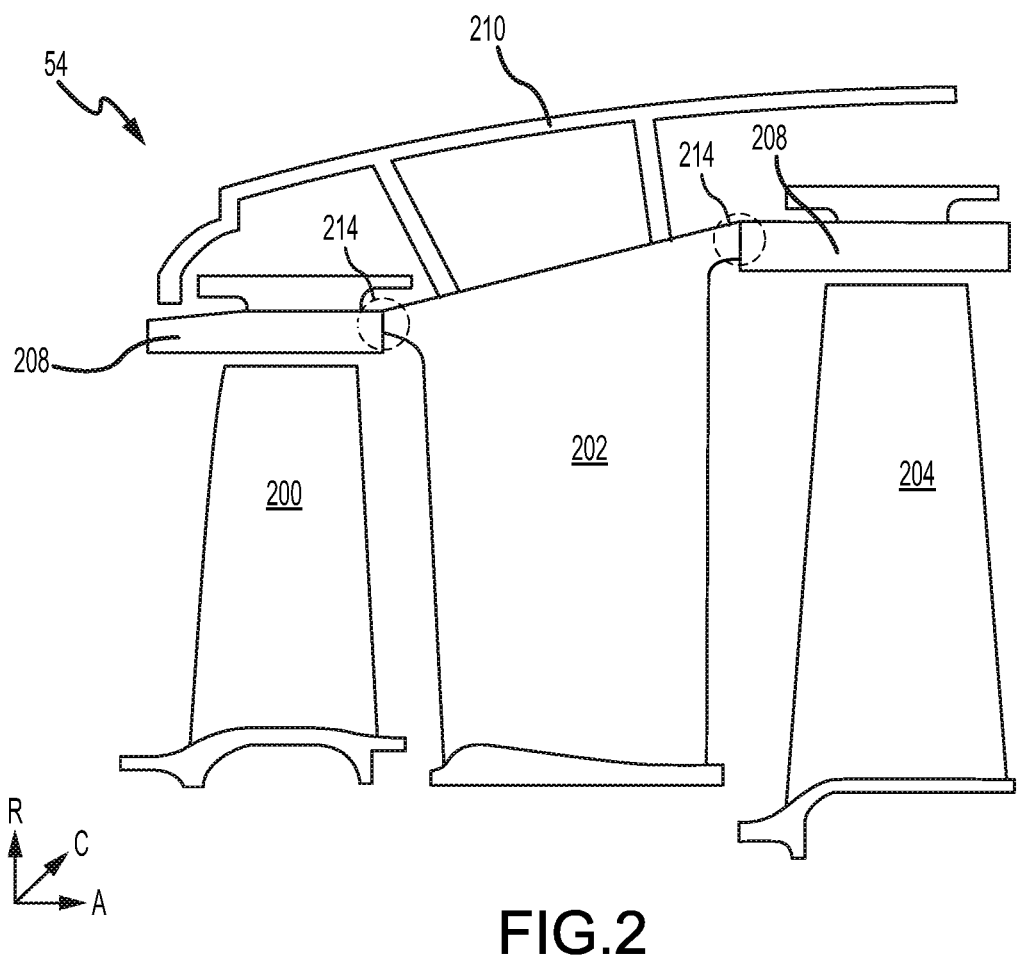
FIG. 2 illustrates a schematic cross-section of a portion of a high pressure turbine section of the gas turbine engine of FIG. 1, in accordance with various embodiments.

With reference now to FIGS. 1 and 2, a portion of the high pressure turbine 54 may include a first rotating member or blade 200, a vane 202, and a second rotating member or blade 204. The first blade 200 and the second blade 204 may each be configured to rotate about the axis A-A' relative to vane 202 in response to receiving a flow of fluid from the combustor section 26. Thus, power from the flow may be converted to mechanical power, or torque, by the first blade 200 and the second blade 204. The vane 202 may be coupled to a frame 210 of the high pressure turbine 54. Vane 202 may direct the flow of air between the first blade 200 and the second blade 204. The vane 202 may act as a stator, which does not rotate relative to the axis A-A'.

Blade outer air seals (BOAS) 208 may be located radially outward from first blade 200 and second blade 204. The BOAS 208 may be a static structure designed to function as a seal to reduce air leakage over the radially outward portions, or "tips," of blades 200 and 204. It may be desirable to reduce leakage of air between BOAS 208 and vane 202. In that regard, the outer static structures of high pressure turbine 54 (e.g., vane 202, BOAS 208, and frame 210) may include seal structures to reduce air leakage. In various embodiments, seal structures 214 may be located between BOAS 208 and vane 202 to reduce such air leakage. Although the disclosure is directed to providing seal structures located between a BOAS and a vane in the high pressure turbine 54, one skilled in the art will realize that the features disclosed herein may be equally applicable to the low pressure turbine 46, the high pressure compressor 52, and the low pressure compressor 44 shown in FIG. 1.

Figure 3:
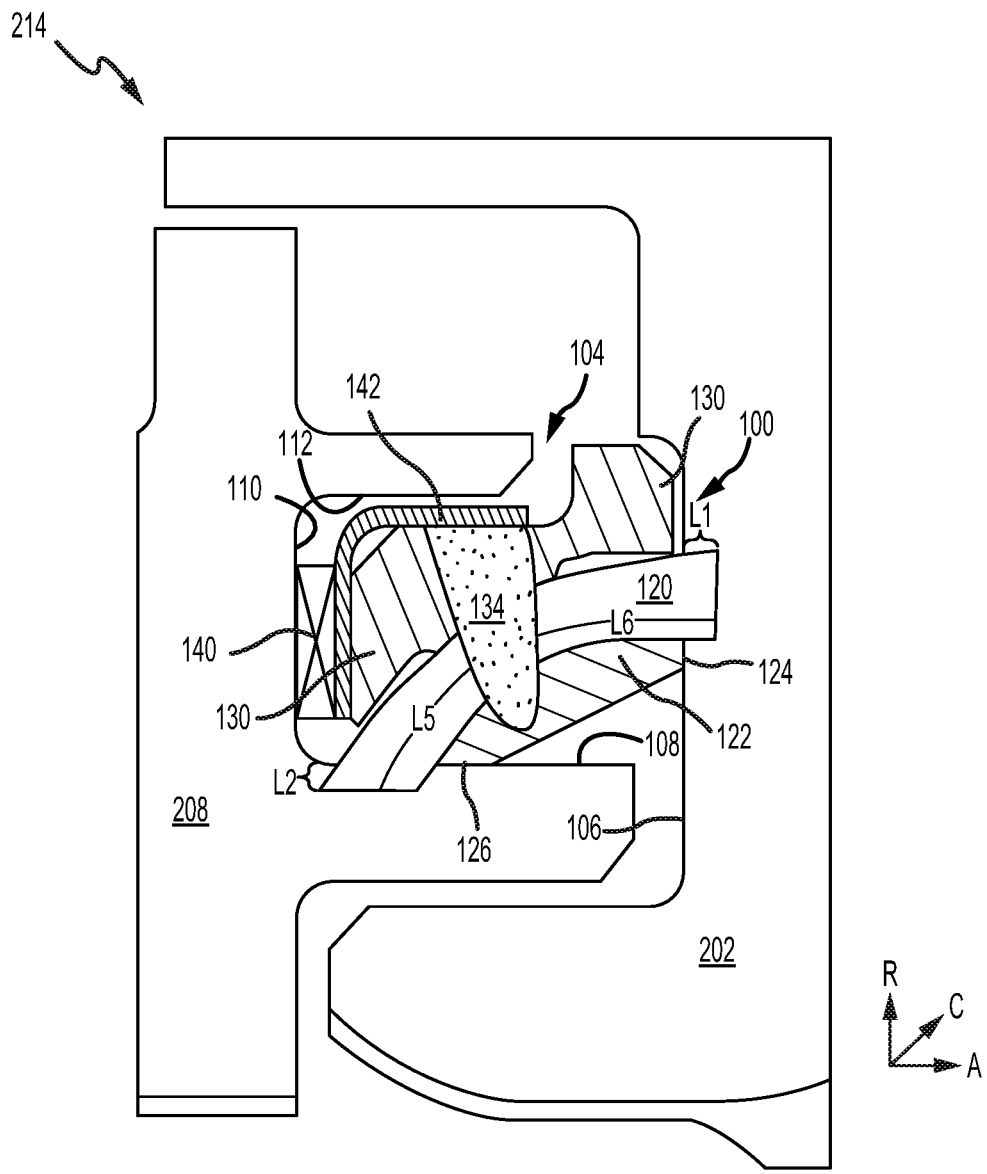
FIG. 3 illustrates a seal structure comprising a brush seal having a bristle pack extending between a radial surface and an axial surface, in accordance with various embodiments.

With reference to FIG. 3, seal structure 214 comprising a brush seal 100 is shown, in accordance with various embodiments. Brush seal 100 may be an annular split ring seal centered about axis of rotation A-A' (FIG. 1). Brush seal 100 may be configured to seal the gas path air (e.g., core flow-path C of FIG. 1) that flows over vane 202 from air flow on the opposite or distal side of brush seal 100.

Brush seal 100 may be disposed in a cavity 104. Cavity 104 may be defined, at least partially, by an axial surface 106 of vane 202, a proximal radial surface 108 of BOAS 208, an axial surface 110 of BOAS 208, and a distal radial surface 112 of BOAS 208. Axial surface 106 of vane 202 may be oriented toward axial surface 110 of BOAS 208. Proximal radial surface 108 may be oriented toward distal radial surface 112.

Brush seal 100 may comprise a bristle pack 120. Bristle pack 120 may contact both axial surface 106 of vane 202 and proximal radial surface 108 of BOAS 208. In various embodiments, bristle pack 120 may comprise curved or bent bristles. The curve of the bristles may allow a first end of the bristles to contact axial surface 106 and a second end of the bristles to contact proximal radial surface 108. In various embodiments, bristle pack 120 may comprise straight bristles oriented at angle, for example, between 15 degrees and 75 degrees, relative to proximal radial surface 108. The angled orientation of the bristles may allow a first of the bristles to contact axial surface 106 and a second end of the bristles to contact proximal radial surface 108. In various embodiments, bristle pack 120 may comprise a first set of bristles extending axially and a second set of bristles extending radially. The first set of bristles may be oriented at an angle, for example, between 50 degrees and 130 degrees, relative to the second set of bristles. The angle of the first set of bristles relative to the second set of bristles may allow an end of the first set of bristles to contact axial surface 106 and an end of the second set of bristles to contact proximal radial surface 108. Bristle pack 120 may comprise bristles of varying diameter and/or bristles that lay at varying angles relative to axis of rotation A-A' (FIG. 1).

Brush seal 100 may further include a backing plate 122 coupled to bristle pack 120. Backing plate 122 may be disposed radially inward of bristle pack 120. Backing plate 122 may extend between axial surface 106 of vane 202 and proximal radial surface 108 of BOAS 208. In that regard, a first surface 124 of backing plate 122 may contact axial surface 106 of vane 202, and a second surface 126 of backing plate 122 may contact proximal radial surface 108 of BOAS 208. In various embodiments, first surface 124 of backing plate may be oriented at an angle that is approximately orthogonal to second surface 126 of backing plate 122, as used herein only "approximately orthogonal" means ±5 degrees. In various embodiments, first surface 124 of backing plate 122 may be oriented at an angle that is approximately parallel to axial surface 106 of vane 202, and second surface 126 of backing plate 122 may be oriented at an angle that is approximately parallel to proximal radial surface 108 of BOAS 208, as used herein only "approximately parallel" means ±5 degrees. Backing plate may be made from a metal or metal alloy. In various embodiments, backing plate 122 may be made from a cobalt alloy. In various embodiments, backing plate 122 may be made from a nickel alloy.

Brush seal 100 may further include a retention structure 130 (also referred to as a side plate) disposed radially outward from bristle pack 120. In various embodiments, brush seal 100 may have a sandwiched construction with layers (e.g., retention structure 130, bristle pack 120, and backing plate 122) welded together. Electron-beam (e-beam) welding may be used to form a joint or weld 134 between backing plate 122, bristle pack 120, and retention structure 130. E-beam welding is done by applying a beam of electrons to materials to be joined. The materials may melt and bond together in response to the beam. The weld may be formed continuously around brush seal 100.

A spring 140 may be disposed in cavity 104. Spring 140 may be an annular structure centered about axis of rotation A-A'. In various embodiments, spring 140 may comprise a series of biasing members oriented circumferentially about axis of rotation A-A'. In various embodiments, spring 140 may comprise a wave spring. Spring 140 may be in operable communication with brush seal 100. Spring may be configured to apply an axial load and force brush seal 100 toward axial surface 106 of vane 202. In various embodiments, spring 140 may be bonded to a carrier 142. Carrier 142 may be located between spring 140 and retention structure 130. Carrier 142 may be bonded to weld 134. Spring 140 may interface with carrier 142 and bias brush seal 100 through carrier 142. In various embodiments, spring 140 may be in direct contact with retention structure 130.

Bristle pack 120 may overhang (i.e., extend past) first surface 124 of backing plate 122. A length L1 of bristle pack 120 extending axially past first surface 124 of backing plate 122 may be selected to ensure bristle pack 120 remains in contact with axial surface 106 of vane 202. For example, slight variations in axial surface 106 may create gaps between portions of backing plate 122 and vane 202 (i.e., between first surface 124 and axial surface 106). The axial overhang of bristle pack 120 may allow bristle pack 120 to extend past first surface 124 and contact axial surface 106 of vane 202 to seal these gaps and prevent fluid leakage. Configuring backing plate 122 to contact and seal axial surface 106 of vane 202 may allow the axial overhang length L1 of bristle pack 120 to be decreased. In various embodiments, length L1 may be less than or equal to 0.015 inches (0.038 cm). In various embodiments, length L1 may less than or equal to 0.010 inches (0.025 cm). In various embodiments, length L1 may be less than 0.008 inches (0.020 cm). Decreasing the overhang length of bristle pack 120 with respect to backing plate 122 may reduce bristle deflection, as the axial interference and associated bristle deflection is limited, as compared to bristle packs with greater overhang lengths, and the unsupported length of the bristles is limited, which tends to limit radial deflection caused by the pressure differential between the area radially outward of brush seal 100 and the area radially inward of brush seal 100. Limiting bristle deflection may reduce distortion and/or yielding of the bristles.

Bristle pack 120 may overhang (i.e., extend past) second surface 126 of backing plate 122. A length L2 of bristle pack 120 extending radially inward past second surface 126 of backing plate 122 may be selected to ensure bristle pack 120 will be in contact with proximal radial surface 108 of BOAS 208. For example, slight variations in proximal radial surface 108 may create gaps between portions second surface 126 of backing plate 122 and proximal radial surface 108 of BOAS 208. The radial overhang of bristle pack 120 allows bristle pack 120 to extend past second surface 126 and contact proximal radial surface 108 to seal these gaps and prevent fluid leakage. Configuring backing plate 122 to contact proximal radial surface 108 may allow length L2 to be reduced. In various embodiments, length L2 may be less than or equal to 0.015 inches (0.038 cm). In various embodiments, length L2 may be less than or equal to 0.010 inches (0.025 cm). In various embodiments, length L2 may be less than or equal to 0.008 inches (0.020 cm). Axial overhang length L1 may be greater than, less than, or equal to radial overhang length L2. A length L5 of the bristles extending from weld 134 to a tip of the bristles proximate proximal radial surface 108 may be greater than, less than, or equal to a length L6 of the bristles extending from weld 134 to a tip of the bristles proximate axial surface 106. In various embodiments, overhang length L1 may be similar to overhang length L2, and length L5 may be greater than or less than length L6.

Decreasing the overhang length of bristle pack 120 with respect to backing plate 122 may reduce bristle deflection, as the radial interference and associated bristle deflection is limited, as compared to bristle packs with greater overhang lengths, and the unsupported length of the bristles is limited, which tends to limit axial deflection caused by the pressure differential between the area radially outward of brush seal 100 and the area radially inward of brush seal 100. Limiting bristle deflection may reduce distortion and/or yielding of the bristles.

A length of the bristles extending from weld 134 to a tip of the bristle proximate proximal radial surface 108 may be greater than, less than, or equal to a length of the bristles extending from weld 134 to a tip of the bristles proximate axial surface 106.

Seal structure 214 comprising brush seal 100 may thus seal two surfaces: axial surface 106 and proximal radial surface 108. The pressure differential between an area radially outward of brush seal 100 and an area radially inward of brush seal 100 generates a pressure load which may force brush seal 100 radially inward toward proximal radial surface 108 of BOAS 208 and axially toward axial surface 106 of vane 202. The radial pressure load acting on brush seal 100 tends to be large enough to keep brush seal 100 in contact with BOAS 208 and prevent fluid leakage across proximal radial surface 108. Further, when the radial pressure load is decreased, the close proximity of distal radial surface 112 of BOAS 208 to carrier 142 and retention structure 130 may limit radially outward movement of brush seal 100. With regard to the axial pressure load, spring 140 may provide additional axial force to overcome frictional and bristle loads and ensure brush seal 100 remains in contact with axial surface 106 of vane 202. Spring 140 may further keep brush seal 100 in contact with axial surface 106 during engine shut-down, such that the axial sealing surface will be seated (i.e., sealed) at engine start-up. The axial sealing surface being seated at engine start-up may decrease and/or avoid occurrences of loose fit damage (i.e., damage caused by the seal impacting the sealing surface).

Figure 4A:
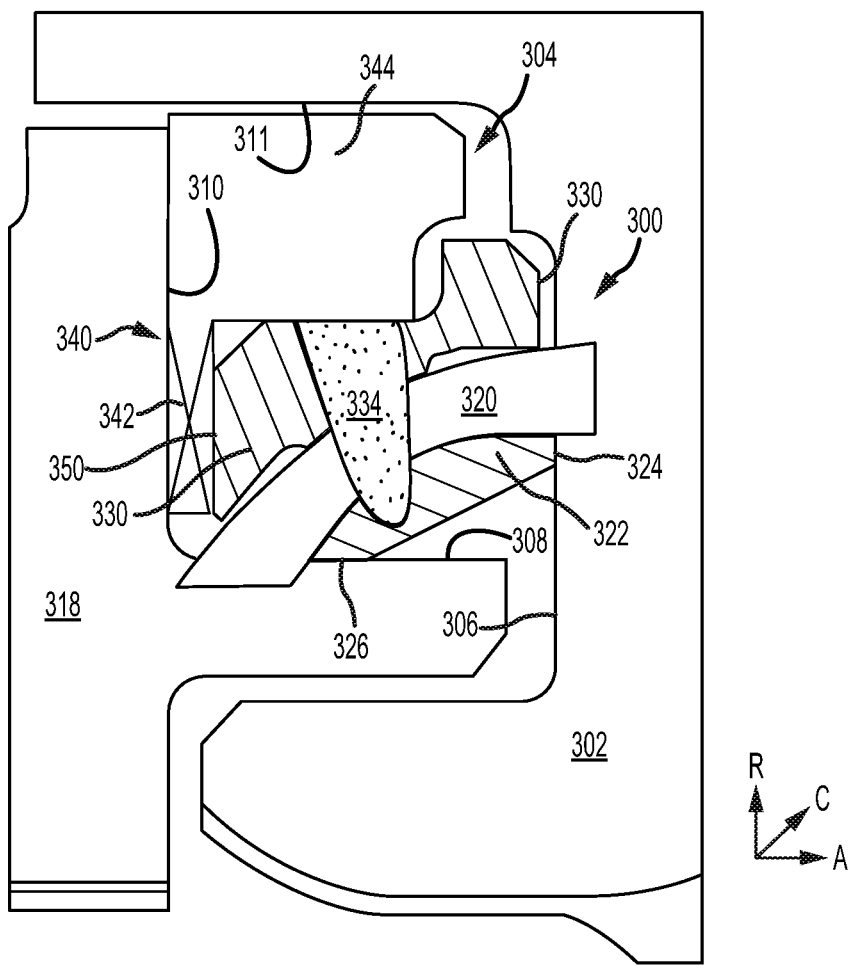
FIG. 4A illustrates a seal structure comprising a brush seal having a bristle pack extending between a radial surface and an axial surface, in accordance with various embodiments.

With reference to FIG. 4A, a seal structure 314, similar to seal structure 214 of FIG. 3, is illustrated, in accordance with various embodiments. Seal structure 314 may include a brush seal 300 (similar to brush seal 100 of FIG. 3) located in a cavity 304. Cavity 304 may be defined, at least partially, by an axial surface 306 of a vane 302, a radial surface 308 of a BOAS 318, an axial surface 310 of BOAS 318, and a radial surface 311 of vane 302.

Brush seal 300 may comprise bristle pack 320, backing plate 322, and retention structure 330. Bristle pack 320, backing plate 322, and retention structure 330 may be bonded together by weld 334. A first surface 324 of backing plate 322 may contact axial surface 306 of vane 302, and a second surface 326 of backing plate 322 may contact radial surface 308 of BOAS 318.

A spring 340 may be disposed in cavity 304. Spring 340 may include a biasing portion 342 and a support structure 344. Support structure 344 may increase a load or stiffness of biasing portion 342. In that regard, spring 340 comprising support structure 344 and biasing portion 342 may be stiffer and/or apply a greater axial force to brush seal 300, as compared to spring 140 in FIG. 2. Spring 340 may be an annular structure centered about axis of rotation A-A' (FIG. 1). In various embodiments, spring 340 may include a series of springs oriented circumferentially about axis of rotation A-A'. In various embodiments, spring 340 may comprise a leaf spring and support structure 344 may include a deflected beam. Biasing portion 342 may be in operable communication with brush seal 300 and may be configured to apply an axial load to retention structure 330.

Referring to FIG. 4B, a radially inward looking view of spring 340 is illustrated, according to various embodiments. Support structure 344 of spring 340 may be disposed radially outward of retention structure 330. Biasing portion 342 of spring 340 may be located between axial surface 310 of BOAS 318 (FIG. 4A) and retention structure 330. Biasing portion 342 may apply an axial load to retention structure 330 to force brush seal 300 toward axial surface 306 of vane 302. Biasing portion 342 may contact and apply force to a surface 350 of retention structure 330 at interfaces 352 to force brush seal 300 toward axial surface 306 of vane 302.

Returning to FIG. 4A, seal structure 314 comprising brush seal 300 may thus seal two surfaces: axial surface 306 of vane 302 and radial surface 308 of BOAS 318. The pressure differential between the area radially outward of brush seal 300 and the area radially inward of brush seal 300 may generate a pressure load which will force brush seal 300 radially inward toward radial surface 308. The radial pressure load acting on brush seal 300 tends to be large enough to keep brush seal in contact with radial surface 308 of BOAS 318. Further, when the radial pressure load is decreased, the close proximity of support structure 344 to radial surface 311 of vane 302 tends to limit radially outward movement of brush seal 300. With regard to the axial pressure load, spring 340 may provide additional axial force to overcome frictional and bristle loads and ensure brush seal 300 remains in contact with axial surface 306 of vane 302. Spring 340 may further keep brush seal 300 in contact with axial surface 306 during engine shut-down, such that the axial sealing surface will be seated (i.e., sealed) at engine start-up. The axial sealing surface being seated at engine start-up may decrease and/or avoid occurrences of loose fit damage (i.e., damage caused by the seal impacting the sealing surface).

With reference to FIG. 5, a seal structure 414 is illustrated, in accordance with various embodiments. Seal structure 414 may comprise a brush seal 400 located in a cavity 404. Cavity 404 may be defined, at least partially, by an axial surface 402 of a vane 412, a proximal radial surface 406 of vane 412, a proximal radial surface 408 of a BOAS 418, an axial surface 410 of BOAS 418, a distal radial surface 411 of BOAS 418, and a distal radial surface 413 of vane 412. Axial surface 402 of vane 412 may be oriented toward axial surface 410 of BOAS 418. Proximal radial surface 406 of vane 412 may be oriented toward distal radial surface 413 of vane 412. Proximal radial surface 408 of a BOAS 418 may be oriented toward distal radial surface 411 of BOAS 418.

Brush seal 400 may comprise bristle pack 420, backing plate 422, and retention structure 430. Bristle pack 420, backing plate 422, and retention structure 430 may be bonded together by weld 434. Bristle pack 420 may be curved such that bristle pack 420 contacts both proximal radial surface 406 of vane 412 and proximal radial surface 408 of BOAS 418. Backing plate 422 may be curved such that a first surface 424 of backing plate 422 contacts proximal radial surface 406 of vane 412, and a second surface 426 of backing plate 422 contacts proximal radial surface 408 of BOAS 418. First surface 424 of backing plate 422 may be oriented at an angle that is parallel to proximal radial surface 406 of vane 412. Second surface 426 of backing plate 422 may be oriented at an angle that is parallel to proximal radial surface 408 of BOAS 418. In various embodiments, first surface 424 of backing plate 422 may be coplanar with second surface 426 of backing plate 422.

Bristle pack 420 may overhang (i.e., extend past) first surface 424 and second surface 426 of backing plate 422. A length L3 of bristle pack 420 extending radially inward past first surface 424 of backing plate 422 may be selected to ensure bristle pack 420 remains in contact with proximal radial surface 406 of vane 412. A length L4 of bristle pack 420 extending radially inward past second surface 426 of backing plate 422 may be selected to ensure bristle pack 420 remains in contact with proximal radial surface 408 of BOAS 418. Configuring backing plate 422 to contact proximal radial surface 406 of vane 412 and proximal radial surface 408 of BOAS may allow lengths L3 and L4 to be decreased. In various embodiments, lengths L3 and L4 may be less than or equal to 0.015 inches (0.038 cm). In various embodiments, length L3 and L4 may be less than or equal to 0.010 inches (0.025 cm). In various embodiments, lengths L3 and L4 may be less than or equal to 0.008 inches (0.020 cm). Length L3 may be greater than, less than, or equal to length L4. Decreasing the overhang length of bristle pack 420 with respect to backing plate 422 may reduce bristle deflection, as the radial interference and associated bristle deflection is limited, as compared to bristle packs with greater overhang lengths, and the unsupported length of the bristles is limited, which tends to limit axial deflection caused by the pressure differential between the area radially outward of brush seal 400 and the area radially inward of brush seal 400. Limiting bristle deflection may reduce distortion and/or yielding of the bristles.

Seal structure 414 comprising brush seal 400 may thus seal two surfaces: proximal radial surface 406 of vane 412 and proximal radial surface 408 of BOAS 418. The pressure differential between the area radially outward of brush seal 400 and the area radially inward of brush seal 400 may generate a pressure load which will force brush seal 400 radially inward toward proximal radial surfaces 406 and 408. The radial pressure load acting on brush seal 400 tends to be large enough to keep brush seal in contact with proximal radial surface 408 of BOAS and proximal radial surface 406 of vane 412 and prevent fluid leakage across proximal radial surfaces 406 and 408. Further, when the radial pressure load is decreased, the close proximity of retention structure 430 to distal radial surface 411 of BOAS 208 and distal radial surface 413 of vane 412 may limit radially outward movement of brush seal 400.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal structure, comprising:
    a cavity defined at least partially by an axial surface and a radial surface; and
    a brush seal disposed in the cavity, the brush seal comprising:
        a bristle pack including a first end contacting the axial surface and a second end contacting the radial surface, and
        a backing plate coupled to the bristle pack, wherein a first surface of the backing plate contacts the axial surface and a second surface of the backing plate contacts the radial surface, and wherein the second end of the bristle pack is configured to extend past the second surface of the backing plate.

2. The seal structure of claim 1, further comprising a retention structure coupled to the bristle pack opposite the backing plate.

3. The seal structure of claim 2, further comprising a spring in operable communication with the retention structure, wherein the spring forces the bristle pack toward the axial surface.

4. The seal structure of claim 3, wherein the spring comprises at least one of a wave spring or a leaf spring.

5. The seal structure of claim 3, wherein the spring comprises a support structure disposed radially outward of the retention structure.

6. The seal structure of claim 1, wherein a first distance extending from the first end of the bristle pack to the first surface of the backing plate is less than or equal to 0.010 inches, and wherein a second distance extending from the second end of the bristle pack to the second surface of the backing plate is less than or equal to 0.010 inches.

7. The seal structure of claim 1, wherein the seal structure further comprises a weld bonding the bristle pack to the backing plate, and wherein a first length the bristle pack extending from the weld to the axial surface of the cavity is different from a second length of the bristle pack extending from the weld to the radial surface of the cavity.

8. The seal structure of claim 1, wherein the first surface of the backing plate is parallel to the axial surface of the cavity, and the second surface of the backing plate is parallel to the radial surface of the cavity.

9. The seal structure of claim 1, wherein the backing plate comprises at least one of a cobalt alloy or a nickel alloy.

10. A seal structure for a gas turbine engine, comprising:
    a vane;
    a blade outer air seal (BOAS) adjacent to the vane; and
    a brush seal disposed in a cavity defined at least partially by a first surface of the BOAS and a second surface of the vane, the brush seal comprising:
        a bristle pack including a first end contacting the first surface of the BOAS and a second end contacting the second surface of the vane, and
        a backing plate coupled to the bristle pack, wherein a first surface of the backing plate contacts the first surface of the BOAS and a second surface of the backing plate contacts the second surface of the vane, and wherein the first end of the bristle pack is configured to extend past the first surface of the backing plate, and wherein the second end of the bristle pack is configured to extend past the second surface of the backing plate.

11. The seal structure of claim 10, wherein the first surface of the BOAS comprises a radial surface of the BOAS, and wherein the second surface of the vane comprises a first axial surface of the vane.

12. The seal structure of claim 11, further comprising a spring in operable communication with the brush seal, wherein the spring is located between the brush seal and a second axial surface of the BOAS.

13. The seal structure of claim 12, wherein the spring comprises a support structure disposed radially outward of a biasing portion of the spring.

14. The seal structure of claim 10, wherein the first surface of the BOAS comprises a first radial surface of the BOAS, and wherein the second surface of the vane comprises a second radial surface of the vane.

15. The seal structure of claim 10, wherein the first end of the bristle pack extends a first length beyond the first surface of the backing plate, and wherein the second end of the bristle pack extends a second length beyond the second surface of the backing plate.

16. The seal structure of claim 15, wherein the first length is different from the second length.

17. The seal structure of claim 10, wherein the first surface of the backing plate is oriented substantially orthogonal to the second surface of the backing plate.

18. A seal structure, comprising:
    a vane;
    a blade outer air seal (BOAS) adjacent to the vane; and
    a brush seal disposed in a cavity defined at least partially by a proximal radial surface of the BOAS and an axial surface of the vane, the brush seal comprising:
        a bristle pack including a first end contacting the proximal radial surface of the BOAS and a second end contacting the axial surface of the vane, and
        a backing plate coupled to the bristle pack, wherein a first surface of the backing plate contacts the axial surface of the vane and a second surface of the backing plate contacts the proximal radial surface of the BOAS, and wherein the first end of the bristle pack is configured to extend past the second surface of the backing plate.

19. The seal structure of claim 18, further comprising a spring in operable communication with the brush seal.

20. The seal structure of claim 19, wherein the spring comprises a support structure disposed radially outward of a biasing portion of the spring.

* * * * *